United States Patent
Liu et al.

(10) Patent No.: US 11,643,715 B2
(45) Date of Patent: May 9, 2023

(54) COMPOSITE STRUCTURE WITH ALUMINUM-BASED ALLOY LAYER CONTAINING BORON CARBIDE AND MANUFACTURING METHOD THEREOF

(71) Applicant: Industrial Technology Research Institute, Hsinchu (TW)

(72) Inventors: Wu-Han Liu, Miaoli County (TW); Yi-Liang Liao, Changhua County (TW); Tai-Sheng Chen, Hsinchu County (TW); Wei-Tien Hsiao, Hsinchu County (TW); Chang-Chih Hsu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/493,863

(22) Filed: Oct. 5, 2021

(65) Prior Publication Data
US 2023/0074335 A1   Mar. 9, 2023

(30) Foreign Application Priority Data
Sep. 7, 2021   (TW) ................... 110133235

(51) Int. Cl.
*C23C 4/10*   (2016.01)
*C23C 4/06*   (2016.01)
(Continued)

(52) U.S. Cl.
CPC ................. *C23C 4/10* (2013.01); *B32B 3/26* (2013.01); *B32B 3/266* (2013.01); *B32B 3/30* (2013.01);
(Continued)

(58) Field of Classification Search
CPC ............. B32B 2313/02; B32B 2311/24; B32B 2255/06; B32B 2255/205; B32B 15/04;
(Continued)

(56) References Cited

U.S. PATENT DOCUMENTS

| 5,039,633 A | 8/1991 | Pyzik et al. |
| 7,550,029 B2 | 6/2009 | Chen et al. |

(Continued)

FOREIGN PATENT DOCUMENTS

| CN | 103668382 | 3/2014 |
| CN | 103890223 | 6/2014 |

(Continued)

OTHER PUBLICATIONS

Zewu Qi, et al., "Microstructure and mechanical properties of double-wire+arc additively manufactured Al—Cu—Mg alloys", Journal of Materials Processing Technology, vol. 255, Dec. 13, 2017, pp. 347-353.

(Continued)

*Primary Examiner* — Michael E. La Villa
(74) *Attorney, Agent, or Firm* — JCIPRNET

(57) ABSTRACT

A composite structure with an aluminum-based alloy layer containing boron carbide and a manufacturing method thereof are provided. The composite structure includes a substrate with an open hole in that surface and the aluminum-based alloy layer containing boron carbide. The aluminum-based alloy layer is disposed in the open hole and contains aluminum, boron, carbon, and oxygen, wherein the content of aluminum is between 4 at. % and 55 at. %, the content of boron is between 9 at. % and 32 at. %, the content of carbon is between 13 at. % and 32 at. %, the content of oxygen is between 2 at. % and 38 at. %, and the ratio of the content of boron to carbon is between 0.3 and 2.7.

14 Claims, 4 Drawing Sheets

(51) Int. Cl.
| | |
|---|---|
| *C22C 29/06* | (2006.01) |
| *B32B 15/01* | (2006.01) |
| *B32B 3/26* | (2006.01) |
| *B32B 15/20* | (2006.01) |
| *B32B 15/04* | (2006.01) |
| *C22C 32/00* | (2006.01) |
| *C22C 29/02* | (2006.01) |
| *C22C 30/00* | (2006.01) |
| *C22C 1/05* | (2023.01) |
| *C22C 29/14* | (2006.01) |
| *C22C 1/051* | (2023.01) |
| *C22C 29/00* | (2006.01) |
| *C22C 21/00* | (2006.01) |
| *C23C 4/067* | (2016.01) |
| *B32B 3/30* | (2006.01) |
| *C22C 1/02* | (2006.01) |
| *C22C 1/053* | (2023.01) |

(52) U.S. Cl.
CPC .......... *B32B 15/016* (2013.01); *B32B 15/017* (2013.01); *B32B 15/04* (2013.01); *B32B 15/043* (2013.01); *B32B 15/20* (2013.01); *C22C 1/026* (2013.01); *C22C 1/05* (2013.01); *C22C 1/051* (2013.01); *C22C 1/053* (2013.01); *C22C 21/00* (2013.01); *C22C 29/005* (2013.01); *C22C 29/02* (2013.01); *C22C 29/06* (2013.01); *C22C 29/062* (2013.01); *C22C 29/14* (2013.01); *C22C 30/00* (2013.01); *C22C 32/0005* (2013.01); *C22C 32/0052* (2013.01); *C22C 32/0057* (2013.01); *C22C 32/0073* (2013.01); *C23C 4/06* (2013.01); *C23C 4/067* (2016.01); *B32B 2255/06* (2013.01); *B32B 2255/205* (2013.01); *B32B 2311/24* (2013.01); *B32B 2313/02* (2013.01); *Y10T 428/1275* (2015.01); *Y10T 428/12361* (2015.01); *Y10T 428/12368* (2015.01); *Y10T 428/12493* (2015.01); *Y10T 428/12576* (2015.01); *Y10T 428/12736* (2015.01); *Y10T 428/12743* (2015.01); *Y10T 428/12757* (2015.01); *Y10T 428/12764* (2015.01); *Y10T 428/2495* (2015.01); *Y10T 428/24967* (2015.01); *Y10T 428/26* (2015.01)

(58) Field of Classification Search
CPC ..... B32B 15/20; B32B 15/016; B32B 15/017; B32B 15/043; B32B 3/26; B32B 3/266; B32B 3/30; C23C 4/10; C23C 4/06; C23C 4/067; C22C 29/062; C22C 29/005; C22C 29/02; C22C 29/06; C22C 29/14; C22C 1/051; C22C 1/05; C22C 1/053; C22C 1/026; C22C 21/00; C22C 30/00; C22C 32/0057; C22C 32/0073; C22C 32/0052; C22C 32/0005; Y10T 428/12361; Y10T 428/12368; Y10T 428/12493; Y10T 428/12576; Y10T 428/12736; Y10T 428/12743; Y10T 428/12764; Y10T 428/1275; Y10T 428/12757; Y10T 428/2495; Y10T 428/24967; Y10T 428/26

See application file for complete search history.

(56) References Cited

U.S. PATENT DOCUMENTS

| | | |
|---|---|---|
| 9,745,648 B2 | 8/2017 | Olserius et al. |
| 9,770,787 B2 | 9/2017 | Anderson |
| 2010/0104843 A1 | 4/2010 | Pyzik et al. |
| 2010/0129683 A1 | 5/2010 | Lin et al. |
| 2018/0214991 A1* | 8/2018 | Yahata ............... B23K 35/0233 |

FOREIGN PATENT DOCUMENTS

| | | |
|---|---|---|
| CN | 104264201 | 1/2015 |
| CN | 105256249 | 1/2016 |
| CN | 109266992 | 1/2019 |
| CN | 109536955 | 3/2019 |
| CN | 110461535 | 11/2019 |
| CN | 111715974 | 9/2020 |
| EP | 1737993 | 1/2007 |
| TW | I244436 | 12/2005 |

OTHER PUBLICATIONS

Qiuyu Miao, et al., "Comparative study of microstructure evaluation and mechanical properties of 4043 aluminum alloy fabricated by wire-based additive manufacturing", Materials and Design, vol. 186, Sep. 10, 2019, pp. 1-12.

Zewu Qi, et al., "Microstructure and mechanical properties of wire + arc additively manufactured Al—Mg—Si aluminum alloy",Materials Letters, vol. 233, Sep. 8, 2018, pp. 348-350.

"Office Action of Taiwan Counterpart Application", dated Mar. 4, 2022, p. 1-p. 22.

* cited by examiner

COMPOSITE STRUCTURE WITH ALUMINUM-BASED ALLOY LAYER CONTAINING BORON CARBIDE AND MANUFACTURING METHOD THEREOF

CROSS-REFERENCE TO RELATED APPLICATION

This application claims the priority benefit of Taiwan application serial no. 110133235, filed on Sep. 7, 2021. The entirety of the above-mentioned patent application is hereby incorporated by reference herein and made a part of this specification.

TECHNICAL FIELD

The disclosure relates to a composite structure and a manufacturing method thereof, and more particularly relates to a composite structure with an aluminum-based alloy layer containing boron carbide and a manufacturing method thereof.

BACKGROUND

Pure aluminum materials or aluminum alloy materials have the characteristics of light weight and wear resistance, so the same have become common alloy materials in lightweight metals and may be used to repair various metal substrates. However, aluminum welding is different from welding steels substrates because of its high specific heat and enthalpy of fusion resulting in require high heat inputs to melt. The pure aluminum material or the aluminum alloy material is extremely easy to oxidize and generate air pores in welding and subsequent cooling. Besides, the aluminum oxide formed after oxidation has a high melting point, which far exceeds the melting point of the metal substrate that needs to be processed, so it is difficult to repair its substrate, especially for non-weldable aluminum alloy material.

In addition, during the process of repairing with the pure aluminum material or the aluminum alloy material, welding is usually used to fill the pure aluminum material or the aluminum alloy material into the defect of the metal substrate. However, at high welding temperatures, the pure aluminum material or the aluminum alloy material will have issues such as hot cracking, burning through, and collapse upon solidification from its clad surface, which will affect the repair quality.

SUMMARY

The disclosure provides a composite structure with an aluminum-based alloy layer containing boron carbide. The aluminum-based alloy layer contains aluminum, boron, carbon, and oxygen.

The disclosure provides a manufacturing method of a composite structure with an aluminum-based alloy layer containing boron carbide. The aluminum-based alloy layer contains aluminum, boron, carbon, and oxygen.

The composite structure with the aluminum-based alloy layer containing boron carbide of the disclosure includes a substrate in its surface with a hole and the aluminum-based alloy layer containing boron carbide. The aluminum-based alloy layer is disposed in the hole and contains aluminum, boron, carbon, and oxygen. The content of aluminum is between 4 at. % and 55 at. %, the content of boron is between 9 at. % and 32 at. %, the content of carbon is between 13 at. % and 32 at. %, the content of oxygen is between 2 at. % and 38 at. %, and the ratio of the content of boron to carbon is between 0.3 and 2.7.

The manufacturing method of the composite structure with the aluminum-based alloy layer containing boron carbide of the disclosure includes the following steps. A substrate with a hole is provided. An aluminum-based alloy powder containing boron carbide is provided. The aluminum-based alloy powder contains aluminum, boron, carbon, and oxygen. A spray coating process is performed to melt and spray the aluminum-based alloy powder into the hole of the substrate surface to form the aluminum-based alloy layer. In the aluminum-based alloy layer, the content of aluminum is between 4 at. % and 55 at. %, the content of boron is between 9 at. % and 32 at. %, the content of carbon is between 13 at. % % and 32 at. %, the content of oxygen is between 2 at. % and 38 at. %, and the ratio of the content of boron to carbon is between 0.3 to 2.7.

DETAILED DESCRIPTION OF DISCLOSED EMBODIMENTS

Figure 1A:
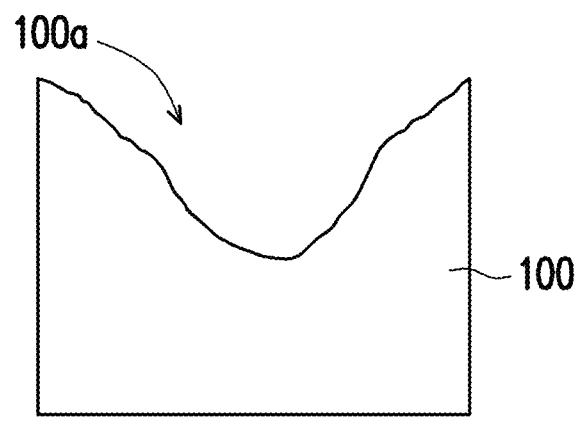
FIG. 1A to FIG. 1B are cross-sectional schematic views of a manufacturing process of a composite structure with an aluminum-based alloy layer according to an embodiment of the disclosure.

The following embodiments are listed in conjunction with the accompanying drawings for detailed description, but the provided embodiments are not intended to limit the scope covered by the disclosure. In addition, the drawings are for illustrative purposes only and are not drawn according to the original dimensions. In order to facilitate understanding, the same elements will be described with the same reference numerals in the following description.

In the embodiment of the disclosure, a composite structure with an aluminum-based alloy layer includes a substrate with a hole in its surface and the aluminum-based alloy layer disposed in the open hole. The hole in the substrate may be a cavity, an air pore, or a crack, which is not limited by the disclosure. In addition, the aluminum-based alloy layer is configured to repair or fill the hole in the substrate, so that the substrate has a flat surface and the mechanical strength of the substrate is improved. Therefore, the composite structure with the aluminum-based alloy layer of the embodiment of the disclosure is a substrate repaired or filled by the aluminum-based alloy layer. In addition, in the method of the disclosure, a substrate with a thickness of not more than 2 mm may be repaired or filled, which can solve the issue of deformation of the substrate during the process of repairing or filling due to the thickness of the substrate being too thin in the prior art, which will be explained in detail below.

Figure 1B:
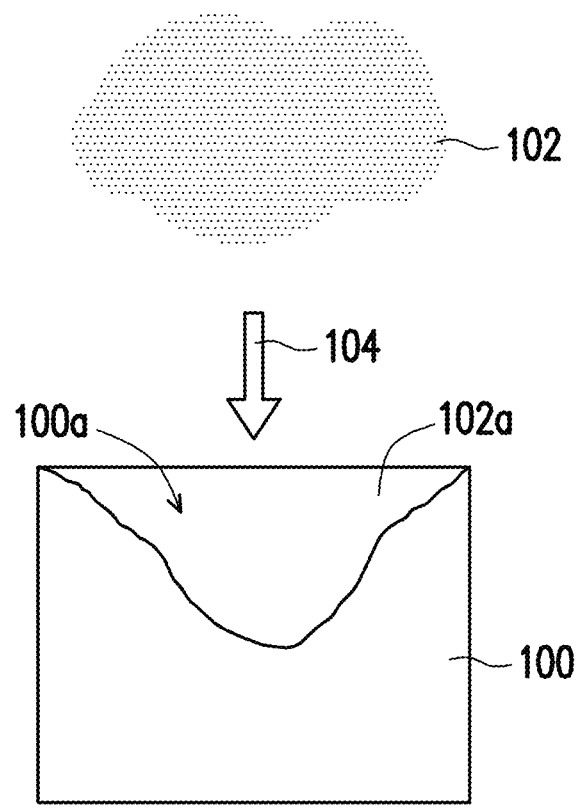

FIG. 1A to FIG. 1B are cross-sectional schematic views of a manufacturing process of a composite structure with an aluminum-based alloy layer according to an embodiment of the disclosure. Firstly, please refer to FIG. 1A. A substrate 100 is provided. The substrate 100 has a hole 100a. In the embodiment, only one hole 100a is shown, but the disclosure is not limited thereto. The hole 100a may be a defect in the substrate 100 or a pattern formed by processing. For example, the hole 100a may be an open cavity, a groove, an air pore, or a crack in the substrate 100. In an embodiment, the thickness of the substrate does not exceed 2 mm, but the disclosure is not limited thereto. The substrate 100 is, for example, a metal substrate or an alloy substrate. For example, the material of the substrate 100 may be aluminum, titanium, magnesium, zinc, steel, stainless steel, an alloy thereof, or a combination thereof. In an embodiment, the substrate 100 is, for example, a wall of a housing, wherein the housing is, for example, an oil tank or other types of thin shells, which is not limited by the disclosure.

Then, please refer to FIG. 1B. An aluminum-based alloy powder 102 containing boron carbide is provided. The aluminum-based alloy powder 102 is used as a material for repairing or filling the hole 100a in the substrate 100 surface. The aluminum-based alloy powder 102 contains boron carbide doped therein. In other words, the aluminum-based alloy powder 102 contains aluminum, boron, carbon, and oxygen. In an embodiment, the aluminum-based alloy powder 102 may be a 4043 aluminum alloy powder containing boron carbide, and based on the total weight of the aluminum-based alloy powder 102, the content of boron carbide does not exceed 10 wt. % (such as between 5 wt. % and 10 wt. %), but the disclosure is not limited thereto. In other embodiments, the aluminum-based alloy powder 102 may be other types of powder. In addition, the 4043 aluminum alloy powder may also contain silicon, iron, and/or other trace elements (such as magnesium, nickel, copper, zinc, manganese, titanium, bismuth, or a combination thereof).

Then, a spray coating process 104 is performed to melt and spray the aluminum-based alloy powder 102 into the hole 100a of the substrate 100 surface to form an aluminum-based alloy layer 102a in the hole 100a. In detail, in the embodiment, by the spray coating process 104, the aluminum-based alloy powder 102 is first melted into a melt. At this time, boron carbide in the aluminum-based alloy powder 102 is alloyed with the aluminum-based alloy, so that the aluminum-based alloy melt contains boron carbide. Afterwards, the melt is sprayed into the hole 100a to form the aluminum-based alloy layer 102a containing boron carbide to repair or fill the hole 100a. In this way, the substrate 100 may have a flat surface, and can have a higher mechanical strength due to the hole 100a being repaired or filled. The spray coating process 104 may be laser spraying or thermal spraying. During the spray coating process 104, the aluminum-based alloy powder 102 is first heated by a laser or a heat source to form the melt, and then sprayed into the hole 100a. Generally speaking, when the size of the hole 100a is smaller or has a finer pattern, laser spraying may be adopted to precisely spray the molten aluminum-based alloy powder 102 into the hole 100a. In an embodiment, the rate of laser spraying is, for example, between 6 mm/min to 8 mm/min, and the aluminum-based alloy powder 102 is sprayed into the hole 100a in a slower but precise manner. In addition, when the size of the hole 100a is larger, thermal spraying may be adopted to quickly spray the molten aluminum-based alloy powder 102 into the hole 100a. In an embodiment, the rate of thermal spraying may be approximately 800 mm/sec, and the aluminum-based alloy powder 102 may be sprayed into the hole 100a in a faster and large-area manner. Through thermal spraying, the aluminum-based alloy powder 102 can even be quickly sprayed onto the surface of the substrate 100 in large area.

After the melt of the aluminum-based alloy powder 102 is sprayed into the hole 100a, the material of the aluminum-based alloy powder 102 reacts with the material of the substrate 100, and forms the aluminum-based alloy layer 102a after solidification. The aluminum-based alloy layer 102a repairs or fills the hole 100a and constitutes the composite structure with the aluminum-based alloy layer of the embodiment of the disclosure together with the substrate 100. Based on the material of the aluminum-based alloy powder 102, the aluminum-based alloy layer 102a contains aluminum, boron, carbon, and oxygen (which partially comes from the surrounding environment during the formation process). In addition, since the aluminum-based alloy layer 102a is formed by reacting the material of the aluminum-based alloy powder 102 with the material of the substrate 100, in the formed aluminum-based alloy layer 102a, the content of aluminum is between 4 at. % and 55 at. %, the content of boron is between 9 at. % and 32 at. %, the content of carbon is between 13 at. % and 32 at. %, the content of oxygen is between 2 at. % and 38 at. %, and the ratio of the content of boron to carbon is between 0.3 and 2.7. In addition, depending on the material of the aluminum-based alloy powder 102 and the material of the substrate 100, the aluminum-based alloy layer 102a may also contain silicon, iron, and/or other trace elements (such as magnesium, nickel, copper, zinc, manganese, titanium, bismuth, or a combination thereof). In an embodiment, when the aluminum-based alloy layer 102a contains silicon, the content of silicon is, for example, between 0.7 at. % and 2.1 at. %. In an embodiment, the aluminum-based alloy layer 102a may include iron either, and the content of iron does not exceed, for example, 32 at. %.

In the embodiment of the disclosure, the aluminum-based alloy layer 102a is formed from the aluminum-based alloy powder 102 with the content of boron carbide of not more than 10 wt. %, and the aluminum-based alloy layer 102a contains aluminum, boron, carbon, and oxygen, wherein the content of aluminum is between 4 at. % and 55 at. %, the content of boron is between 9 at. % and 32 at. %, the content of carbon is between 13 at. % and 32 at. %, and the content of oxygen is between 2 at. % and 38 at. %. Therefore, the aluminum-based alloy layer including boron carbide 102a may have a higher hardness than that aluminum-based alloy layer not including boron carbide. For example, compared to a general commercial aluminum-based alloy layer (not containing boron carbide) formed from the pure 4043 aluminum alloy powder, the $Hv_{0.3}$ Vickers hardness (approximately 100) of the aluminum-based alloy layer 102a is significantly higher than that Vickers hardness (approximately 70) of the general commercial aluminum-based alloy layer.

In addition, in the aluminum-based alloy layer 102a, the ratio of the content of boron to the content of carbon is between 0.3 and 2.7. When the ratio of the content of boron to carbon is less than 0.3, the hardness of the aluminum-based alloy layer is reduced. When the ratio of the content of boron to carbon is greater than 2.7, the hardness of the aluminum-based alloy layer is significantly reduced to near the hardness range of a general commercial aluminum-based alloy layer.

In particular, once the aluminum-based alloy layer 102a is formed from the aluminum-based alloy powder 102 with the content of boron carbide of more than 10 wt. %, the hardness of the aluminum-based alloy layer 102a will be reduced. Therefore, in the aluminum-based alloy powder 102 forming the aluminum-based alloy layer 102a, based on the total weight of the aluminum-based alloy powder 102, the content of boron carbide is not more than 10 wt. %, preferably between 5 wt. % and 10 wt. %. Such boron carbide in the aluminum-based alloy 102a can have an enough high hardness to be used as a repairing layer and/or a strengthening layer of the substrate 100.

Example 1

A 4043 aluminum alloy powder containing 5 wt. % of boron carbide was adopted as a material to fill a hole in a substrate (an aluminum 6061 substrate) surface.

Figure 2:
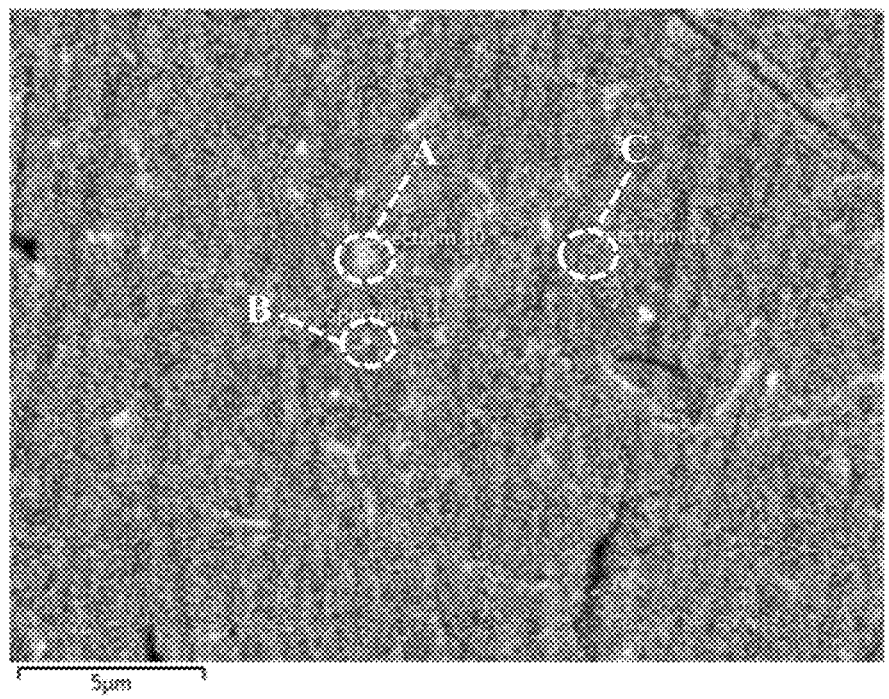
FIG. 2 is a partial electron microscope image of a composite structure with an aluminum-based alloy layer of Example 1.

FIG. 2 is a partial electron microscope image of a composite structure with an aluminum-based alloy layer of Example 1. As shown in FIG. 2, in the composite structure of Example 1, through an electron microscope component analysis, in a region A of the aluminum-based alloy layer, the content of boron was 31.89 at. %, the content of carbon was 18.30 at. %, the content of nitrogen was 6.86 at. %, the content of oxygen was 37.61 at. %, the content of aluminum was 4.55 at. %, the content of silicon was 0.79 at. %, and the content of iron was 31.89 at. %. The region A is a region containing boron carbide in the aluminum-based alloy layer, and the ratio of the content of boron to the content of carbon is 1.74. In a region B of the aluminum-based alloy layer, the content of boron was 0 at. %, the content of carbon was 21.37 at. %, the content of nitrogen was 0 at. %, the content of oxygen was 12.03 at. %, the content of aluminum was 65.44 at. %, the content of silicon was 1.16 at. %, and the content of iron was 0 at. %. In a region C of the aluminum-based alloy layer, the content of boron was 0 at. %, the content of carbon was 31.56 at. %, the content of nitrogen was 0 at. %, the content of oxygen was 7.08 at. %, the content of aluminum was 60.53 at. %, the content of silicon was 0.84 at. %, and the content of iron was 0 at. %.

Example 2

A 4043 aluminum alloy powder containing 10 wt. % of boron carbide was adopted as a material to fill a hole in a substrate (an aluminum 6061 substrate) surface.

Figure 3:
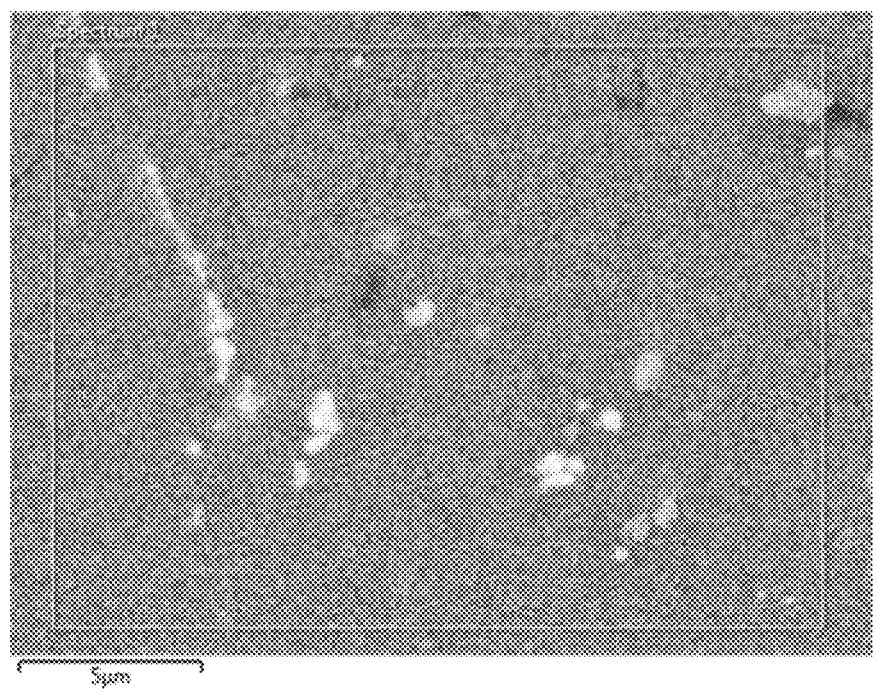
FIG. 3 is a partial electron microscope image of a composite structure with an aluminum-based alloy layer of Example 2.

FIG. 3 is a partial electron microscope image of a composite structure with an aluminum-based alloy layer of Example 2. As shown in FIG. 3, in the composite structure of Example 2, through an electron microscope component analysis, in a region containing boron carbide in the aluminum-based alloy layer, the content of boron was 36.88 at. %, the content of carbon was 13.69 at. %, the content of oxygen was 2.24 at. %, the content of aluminum was 47.19 at. %, and the ratio of the content of boron to carbon was 2.69.

Figure 4:
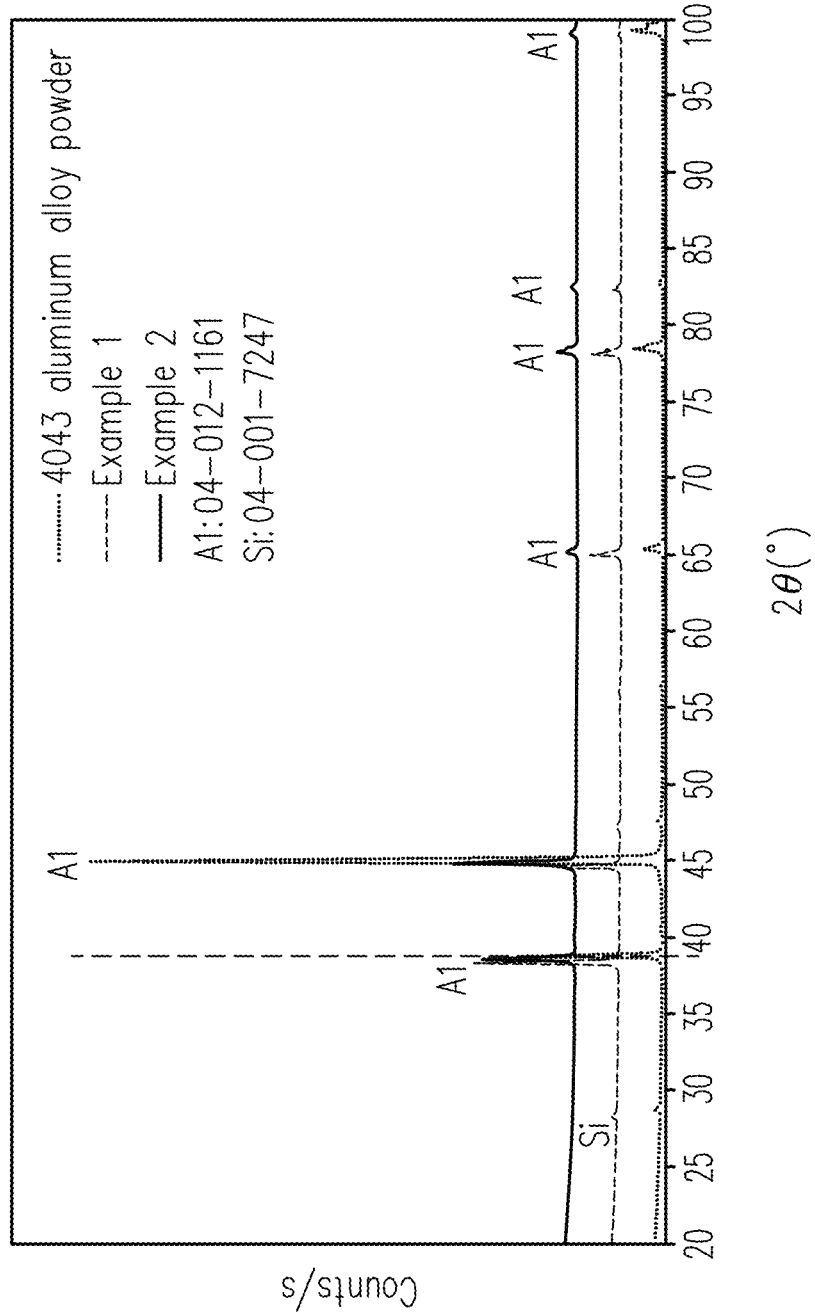
FIG. 4 shows X-ray diffraction (XRD) spectra of a structure of Example 1, a structure of Example 2, and a structure after filling a 4043 aluminum alloy powder into an open hole in a substrate surface.

In addition, the structure of Example 1, the structure of Example 2, and the structure after filling the 4043 aluminum alloy powder into the hole in the substrate surface were subjected to an X-ray diffraction (XRD) analysis, and the results are shown in FIG. 4. It can be seen from FIG. 4 that in the structures of Example 1 and Example 2, positions of diffraction peaks at 40° and 45° are shifted, which indicates that the formed aluminum-based alloy layer does contain boron carbide.

Example 3

A 4043 aluminum alloy powder containing 3 wt. % boron carbide was adopted as a material to fill a hole in a substrate (an aluminum 6061 substrate) surface.

Figure 5:
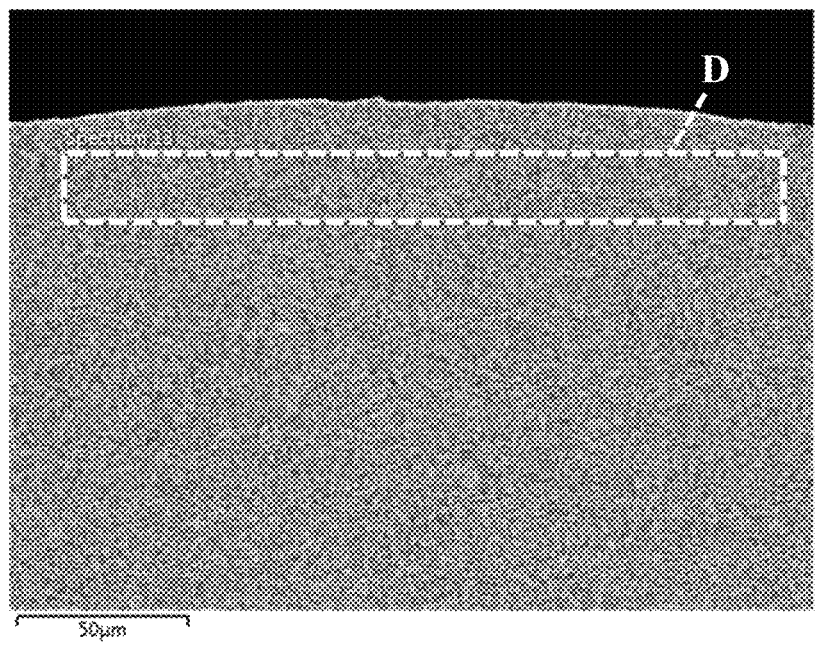
FIG. 5 is a partial electron microscope image of a composite structure with an aluminum-based alloy layer of Example 3.

FIG. 5 is a partial electron microscope image of a composite structure with an aluminum-based alloy layer of Example 3. As shown in FIG. 3, in the composite structure of Example 3, through an electron microscope component analysis, in a region D containing boron carbide in the aluminum-based alloy layer, the content of boron was 9.69 at. %, the content of carbon was 31.17 at. %, the content of oxygen was 2.38 at. %, the content of aluminum was 54.72 at. %, the content of silicon was 2.04 at. %, and the ratio of the content of boron to carbon was 0.31.

Example 4

A 4043 aluminum alloy powder containing 7 wt. % of boron carbide was adopted as a material to fill a hole in a substrate (an aluminum 6061 substrate) surface.

Figure 6:
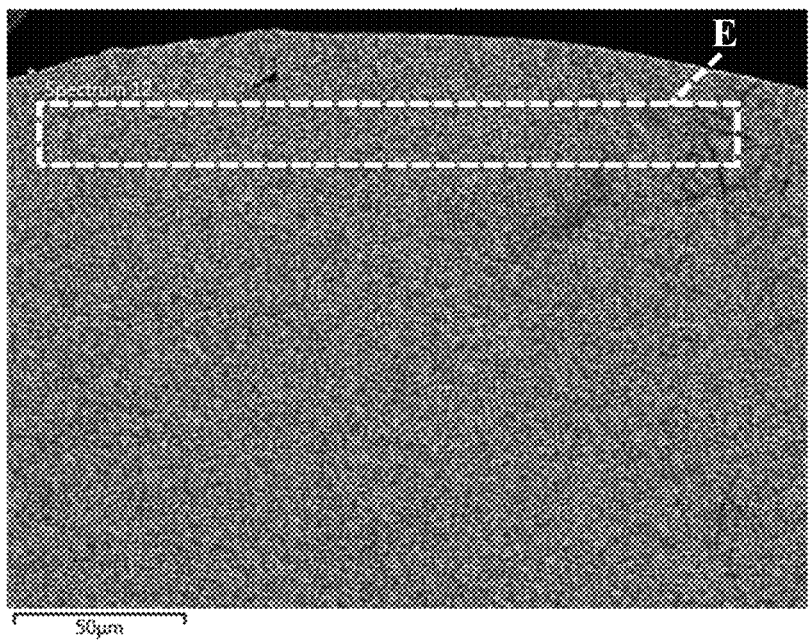
FIG. 6 is a partial electron microscope image of a composite structure with an aluminum-based alloy layer of Example 4.

FIG. 6 is a partial electron microscope image of a composite structure with an aluminum-based alloy layer of Example 4. As shown in FIG. 6, in the composite structure of Example 4, through an electron microscopy component analysis, in a region E containing boron carbide in the aluminum-based alloy layer, the content of boron was 21.56 at. %, the content of carbon was 25.49 at. %, the content of nitrogen was 0.02 at. %, the content of oxygen was 2.54 at. %, the content of aluminum was 48.88 at. %, the content of silicon was 1.51 at. %, and the ratio of the content of boron to carbon was 0.85.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be determined by the scope of the appended claims.

What is claimed is:

1. A composite structure with an aluminum-based alloy layer containing boron carbide, comprising:
   a substrate with a hole in the surface; and
   the aluminum-based alloy layer containing boron carbide, disposed in the hole and containing aluminum, boron, carbon, and oxygen, wherein in a region containing boron carbide of the aluminum-based alloy layer, a content of aluminum is between 4 at. % and 55 at. %, a content of boron is between 9 at. % and 32 at. %, a content of carbon is between 13 at. % and 32 at. %, a content of oxygen is between 2 at. % and 38 at. %, and an atomic ratio of the content of boron to carbon is between 0.3 and 2.7.

2. The composite structure with the aluminum-based alloy layer containing boron carbide according to claim 1, wherein the substrate comprises a metal substrate or an alloy substrate.

3. The composite structure with the aluminum-based alloy layer containing boron carbide according to claim 1, wherein the aluminum-based alloy layer further contains silicon in the region, and a content of silicon is between 0.7 at. % and 2.1 at. %.

4. The composite structure with the aluminum-based alloy layer containing boron carbide according to claim 1, wherein the aluminum-based alloy layer further contains iron in the region, and a content of iron does not exceed 32 at. %.

5. The composite structure with the aluminum-based alloy layer containing boron carbide according to claim 1, wherein the aluminum-based alloy layer further contains a trace element, and the trace element comprises magnesium, nickel, copper, zinc, manganese, titanium, bismuth, or a combination thereof.

6. The composite structure with the aluminum-based alloy layer containing boron carbide according to claim 1, wherein a thickness of the substrate does not exceed 2 mm.

7. The composite structure with the aluminum-based alloy layer containing boron carbide according to claim 1, wherein the substrate comprises a wall of a housing.

8. A manufacturing method of a composite structure with an aluminum-based alloy layer containing boron carbide, comprising:
   providing a substrate with a hole in the surface;
   providing an aluminum-based alloy powder containing boron carbide, wherein the aluminum-based alloy powder containing boron carbide contains aluminum, boron, carbon, and oxygen; and
   performing a spray coating process to melt and spray the aluminum-based alloy powder containing boron carbide into the hole of the substrate surface to form the aluminum-based alloy layer containing boron carbide, wherein
   in a region containing boron carbide of the aluminum-based alloy layer, a content of aluminum is between 4 at. % and 55 at. %, a content of boron is between 9 at. % and 32 at. %, a content of carbon is between 13 at. % to 32 at. %, a content of oxygen is between 2 at. % and 38 at. %, and an atomic ratio of the content of boron to carbon is between 0.3 and 2.7.

9. The manufacturing method of the composite structure with the aluminum-based alloy layer containing boron carbide according to claim 8, wherein the substrate comprises a metal substrate or an alloy substrate.

10. The manufacturing method of the composite structure with the aluminum-based alloy layer containing boron carbide according to claim 8, wherein the aluminum-based alloy powder containing boron carbide further contains silicon, and a content of silicon in the region in the aluminum-based alloy layer is between 0.7 at. % and 2.1 at. %.

11. The manufacturing method of the composite structure with the aluminum-based alloy layer containing boron carbide according to claim 8, wherein the aluminum-based alloy powder containing boron carbide further contains iron, and a content of iron in the region in the aluminum-based alloy layer does not exceed 32 at. %.

12. The manufacturing method of the composite structure with the aluminum-based alloy layer containing boron carbide according to claim 8, wherein the spray coating process comprises laser spraying or thermal spraying.

13. The manufacturing method of the composite structure with the aluminum-based alloy layer containing boron carbide according to claim 8, wherein a thickness of the substrate does not exceed 2 mm.

14. The manufacturing method of the composite structure with the aluminum-based alloy layer containing boron carbide according to claim 8, wherein the substrate comprises a wall of a housing.

\* \* \* \* \*